(12) United States Patent
Yamashita (10) Patent No.: US 11,734,961 B2
(45) Date of Patent: Aug. 22, 2023

(54) VEHICLE DIAGNOSTIC DEVICE AND VEHICLE DIAGNOSTIC SYSTEM (71) Applicant: TOYOTA JIDOSHA KABUSHIKI KAISHA, Aichi-ken (JP)

(72) Inventor: Yoshiya Yamashita, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 234 days.

(21) Appl. No.: 17/334,802

(22) Filed: May 31, 2021

(65) Prior Publication Data
US 2021/0390794 A1 Dec. 16, 2021

(30) Foreign Application Priority Data
Jun. 11, 2020 (JP) .................................. 2020-101446

(51) Int. Cl.
*G07C 5/00* (2006.01)
*G08G 1/00* (2006.01)
*G07C 5/08* (2006.01)

(52) U.S. Cl.
CPC .............. *G07C 5/006* (2013.01); *G07C 5/008* (2013.01); *G07C 5/0808* (2013.01); *G08G 1/207* (2013.01)

(58) Field of Classification Search
CPC ...... G07C 5/006; G07C 5/008; G07C 5/0808; G08G 1/207; B60W 2555/20; B60W 2756/10; B60W 50/0205; G05B 2219/2637; G05B 19/042; B60R 16/0232
See application file for complete search history.

(56) References Cited

U.S. PATENT DOCUMENTS

| 9,389,198 B2* | 7/2016 | Pursifull ............... F02D 41/222 |
| 9,739,227 B2* | 8/2017 | Stellwagen ......... F02B 29/0493 |
| 10,507,730 B2* | 12/2019 | Grimes .................... B60L 53/68 |
| 2012/0227714 A1* | 9/2012 | Surnilla ................. F02M 26/14 |
| | | 123/568.19 |
| 2012/0227719 A1* | 9/2012 | Surnilla ................. F02M 26/14 |
| | | 123/434 |
| 2014/0238348 A1* | 8/2014 | Pursifull ............... F02D 41/222 |
| | | 123/434 |
| 2014/0238370 A1* | 8/2014 | Pursifull ............ G01N 33/0006 |
| | | 123/690 |
| 2014/0251129 A1* | 9/2014 | Upadhyay .......... B01D 46/0086 |
| | | 96/400 |
| 2014/0316672 A1* | 10/2014 | Uhrich .................... F02P 5/045 |
| | | 123/406.13 |

(Continued)

FOREIGN PATENT DOCUMENTS

| JP | 2009156184 A | 7/2009 | |
| WO | WO-03098908 A1 * | 11/2003 | ............. G06Q 40/00 |
| WO | WO-2008132396 A2 * | 11/2008 | ............. G07C 5/008 |

*Primary Examiner* — Joseph J Dallo
(74) *Attorney, Agent, or Firm* — Hauptman Ham, LLP (57) ABSTRACT

Provided is a vehicle diagnostic device that diagnoses at least one vehicle on which an engine is mounted, in which the vehicle includes a moisture sensitive sensor disposed in an engine compartment and configured to detect moisture, and the vehicle diagnostic device is configured to diagnose that there is a possibility of the vehicle being exposed to dust in a case where an intake pressure of the engine is higher than a predetermined value and the moisture is detected by the moisture sensitive sensor. Therefore, a possibility of the vehicle being exposed to dust can be diagnosed before the vehicle fails.

2 Claims, 4 Drawing Sheets

(56) References Cited

U.S. PATENT DOCUMENTS

| | | | |
|---|---|---|---|
| 2014/0316676 A1* | 10/2014 | Pursifull | G01N 27/223 |
| | | | 701/102 |
| 2015/0007720 A1* | 1/2015 | Vu | B01D 46/76 |
| | | | 95/20 |
| 2019/0048813 A1* | 2/2019 | Dudar | F02D 41/0087 |
| 2019/0163549 A1* | 5/2019 | Huang | G06F 11/0721 |

* cited by examiner

VEHICLE DIAGNOSTIC DEVICE AND VEHICLE DIAGNOSTIC SYSTEM

CROSS-REFERENCE TO RELATED APPLICATION

This application claims priority to Japanese Patent Application No. 2020-101446 filed on Jun. 11, 2020, incorporated herein by reference in its entirety.

BACKGROUND

1. Technical Field

The present disclosure relates to a vehicle diagnostic device and a vehicle diagnostic system.

2. Description of Related Art

In the related art, as a vehicle diagnostic device of such a type, a device that diagnoses a vehicle on which an engine is mounted has been proposed (for example, see Japanese Unexamined Patent Application Publication No. 2009-156184 (JP 2009-156184 A)). This vehicle diagnostic device determines whether or not an intake pipe is damaged based on an air temperature in an engine compartment (engine compartment) and an intake air temperature of the engine, and diagnoses that dust can enter the engine from a damaged part in a case where the intake pipe is damaged.

SUMMARY

However, the vehicle diagnostic device cannot diagnose the possibility of dust entering the engine until a vehicle actually fails, such as damage of the intake pipe. It is desired to avoid the failure of the vehicle before occurring, and thus it is desired to diagnose the possibility of the vehicle being exposed to dust, before the vehicle fails.

A vehicle diagnostic device and a vehicle diagnostic system according to aspects of the present disclosure are to diagnose a possibility of a vehicle being exposed to dust, before a vehicle fails.

The vehicle diagnostic device and the vehicle diagnostic system according to the aspects of the present disclosure employ the following means.

A first aspect of the present disclosure relates to a vehicle diagnostic device that diagnoses at least one vehicle on which an engine is mounted. The vehicle includes a moisture sensitive sensor disposed in an engine compartment and configured to detect moisture. The vehicle diagnostic device is configured to diagnose that there is a possibility of the vehicle being exposed to dust in a case where an intake pressure of the engine is higher than a predetermined value and the moisture is detected by the moisture sensitive sensor.

In the vehicle diagnostic device according to the first aspect of the present disclosure, the vehicle includes the moisture sensitive sensor disposed in the engine compartment and configured to detect moisture. Further, the vehicle diagnostic device is configured to diagnose that there is the possibility of the vehicle being exposed to dust in a case where the intake pressure of the engine is higher than the predetermined value and the moisture is detected by the moisture sensitive sensor. In a case where the intake pressure of the engine is higher than the predetermined value, an intake system of the engine is considered to be clogged. Further, in a case where the moisture is detected by the moisture sensitive sensor that is disposed in the engine compartment, estimation is made that the engine compartment is opened and the inside thereof is cleaned. In a case where the vehicle is exposed to dust, the intake system of the engine is often clogged, or the engine compartment is opened and the inside thereof is often cleaned. Therefore, by diagnosing that there is the possibility of the vehicle being exposed to dust in a case where the intake pressure of the engine is higher than the predetermined value and the moisture is detected by the moisture sensitive sensor, the possibility of the vehicle being exposed to dust can be diagnosed before the vehicle fails. Here, the "predetermined value" is a threshold value for determining whether or not the intake system of the engine is clogged.

In the vehicle diagnostic device according to the first aspect of the present disclosure, the moisture sensitive sensor may be disposed at a position that is not exposed to water while the vehicle is traveling. In this way, the cleaning in the engine compartment can be detected more reliably, and the possibility of the vehicle being exposed to dust can be diagnosed more accurately.

A second aspect of the present disclosure relates to a vehicle diagnostic system that diagnoses a plurality of vehicles on which an engine and a moisture sensitive sensor that is disposed in an engine compartment and configured to detect moisture are mounted. The vehicle diagnostic system includes the vehicle diagnostic device that diagnoses the vehicles according to any one of the aspects of the present disclosure, that is, basically, the vehicle diagnostic device that diagnoses at least one vehicle on which the engine is mounted, in which the vehicle includes the moisture sensitive sensor disposed in the engine compartment and configured to detect moisture, and the vehicle diagnostic device is configured to diagnose that there is a possibility of the vehicle being exposed to dust in a case where an intake pressure of the engine is higher than a predetermined value and the moisture is detected by the moisture sensitive sensor, and an information transmission device. The information transmission device is configured to transmit information to at least one dealer of the vehicle. The vehicles each include a positional information acquisition device configured to acquire positional information regarding a current position of the vehicle. The vehicle diagnostic device is configured to transmit a diagnosis result of whether or not there is a possibility of the vehicle being exposed to dust and the positional information of the diagnosed vehicle to the information transmission device. The information transmission device is configured to set an area in which the diagnosed vehicle is currently positioned based on the positional information, and to transmit information that there is the possibility of being exposed to dust in the set area to the dealer in a case where, in the set area, at least one of a condition that a ratio of the number of the vehicles diagnosed as having the possibility of being exposed to dust to a total number of the vehicles exceeds a predetermined ratio and a condition that the number of the vehicles diagnosed as having the possibility of being exposed to dust exceeds a predetermined number is established, based on the diagnosis result.

The vehicle diagnostic system according to the second aspect of the present disclosure includes the vehicle diagnostic device according to any one of the aspects of the present disclosure. Therefore, the effect exerted by the vehicle diagnostic device according to any one of the aspects of the present disclosure, for example, the effect of being capable of diagnosing the possibility of the vehicle being exposed to dust before the vehicle fails can be exerted.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment for implementing the present disclosure will be described.

Figure 1:
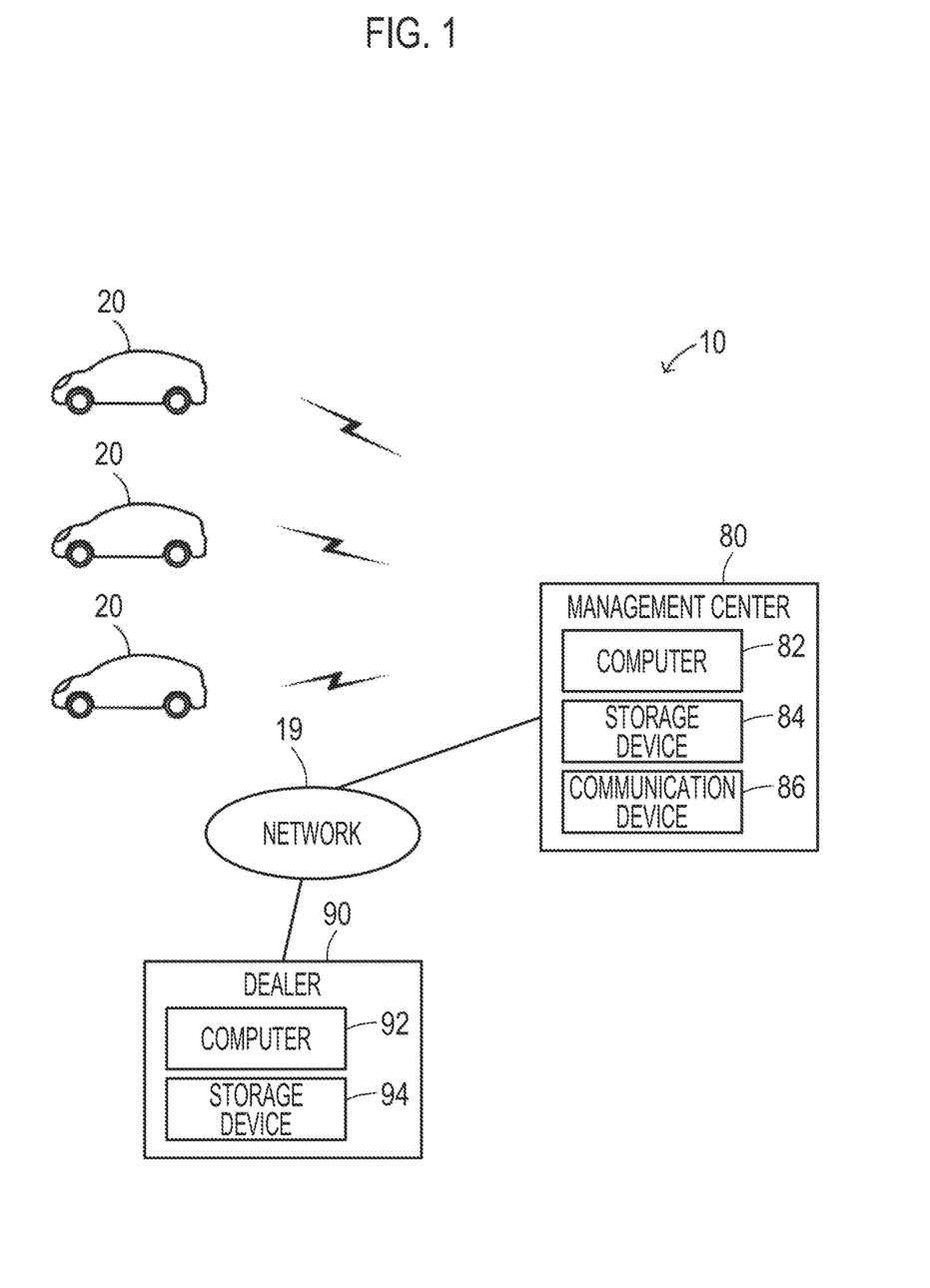
FIG. 1 is a configuration diagram showing an outline of a configuration of a vehicle diagnostic system 10 including a vehicle diagnostic device as an embodiment of the present disclosure.

FIG. 1 is a configuration diagram showing an outline of a configuration of a vehicle diagnostic system 10 including a vehicle diagnostic device as an embodiment of the present disclosure. The vehicle diagnostic system 10 includes, as shown in FIG. 1, a plurality of hybrid vehicles 20, a management center 80, and a dealer 90.

Figure 2:
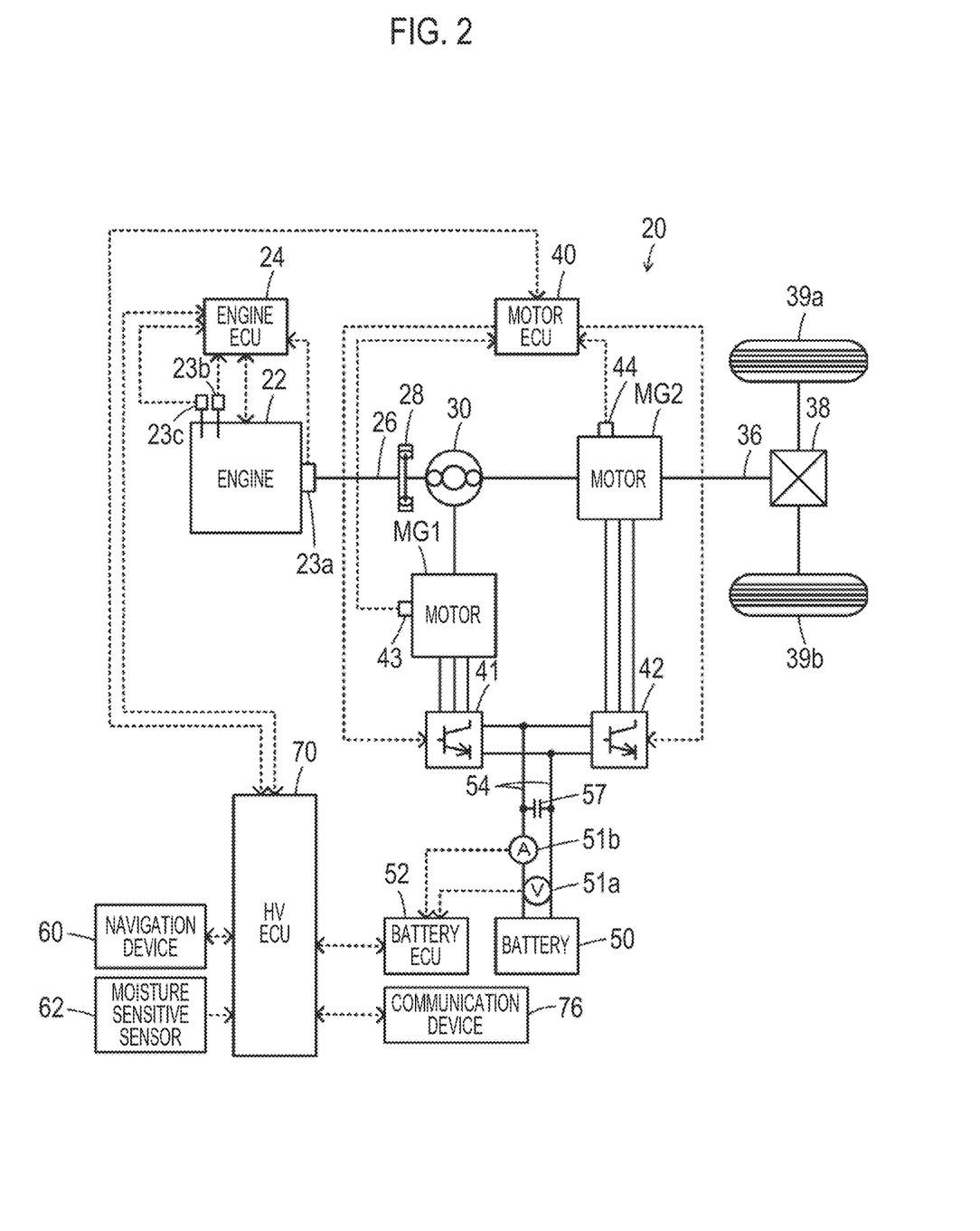
FIG. 2 is a configuration diagram showing an outline of a configuration of a hybrid vehicle 20.

FIG. 2 is a configuration diagram showing an outline of a configuration of the hybrid vehicle 20. As shown in FIG. 2, the hybrid vehicle 20 includes an engine 22, a planetary gear 30, motors MG1, MG2, inverters 41, 42, a battery 50, a navigation device 60, and an electronic control unit 70 for a hybrid (hereinafter, referred to as "HVECU").

The engine 22 is configured as an internal combustion engine that outputs power using gasoline, light oil, or the like as fuel, and is connected to a carrier of the planetary gear 30 via a damper 28. The operation of the engine 22 is controlled by an electronic control unit 24 for an engine (hereinafter, referred to as "engine ECU").

Although not shown, the engine ECU 24 is configured as a microprocessor centered on a CPU, and includes a ROM that stores processing programs or a RAM that temporarily stores data, an input and output port, and a communication port in addition to the CPU. Signals from various sensors needed to control the operation of the engine 22 are input to the engine ECU 24 via the input port. Examples of the signals input to the engine ECU 24 include a crank angle θcr from a crank position sensor 23a that detects a rotational position of a crankshaft 26 of the engine 22 or a coolant temperature Tw from a coolant temperature sensor 23b that detects a temperature of a coolant of the engine 22. In addition, examples of the signals include an intake pressure Pi from an intake pressure sensor 23c that detects an intake pressure of the engine 22 or an intake air amount Qa from an air flow meter (not shown) that detects an intake air amount of the engine 22. Various control signals needed to control the operation of the engine 22 are output from the engine ECU 24 via the output port. The engine ECU 24 calculates a rotation speed Ne of the engine 22 based on the crank angle θcr from the crank position sensor 23a. The engine ECU 24 calculates a load factor KL (ratio of a volume of air actually taken in one cycle to a stroke volume of the engine 22 per one cycle) based on the intake air amount Qa detected by the air flow meter and the rotation speed Ne.

The planetary gear 30 is configured as a planetary gear mechanism of a single pinion type. A rotor of the motor MG1 is connected to a sun gear of the planetary gear 30. A drive shaft 36 coupled to drive wheels 39a, 39b via a differential gear 38 is connected to a ring gear of the planetary gear 30. The crankshaft 26 of the engine 22 is connected to the carrier of the planetary gear 30 via the damper 28.

The motor MG1 is configured as, for example, a synchronous motor generator, and the rotor is connected to the sun gear of the planetary gear 30 as described above. The motor MG2 is configured as, for example, a synchronous motor generator, and a rotor is connected to the drive shaft 36. The inverters 41, 42 are used to drive the motors MG1, MG2, and are connected to the battery 50 via an electric power line 54. A smoothing capacitor 57 is attached to the electric power line 54. The motors MG1, MG2 are rotationally driven by switching control of a plurality of switching elements (not shown) of the inverters 41, 42 by an electronic control unit 40 for a motor (hereinafter referred to as "motor ECU").

Although not shown, the motor ECU 40 is configured as a microprocessor centered on a CPU, and includes a ROM that stores processing programs or a RAM that temporarily stores data, an input and output port, and a communication port in addition to the CPU. Signals from various sensors needed to control the operation of the motors MG1, MG2, for example, rotational positions θm1, θm2 from rotational position detection sensors 43, 44 that detect rotational positions of the rotors of the motors MG1, MG2 are input to the motor ECU 40 via the input port. Switching control signals and the like to the switching elements of the inverters 41, 42 are output from the motor ECU 40 via the output port. The motor ECU 40 is connected to the HVECU 70 via the communication port.

The battery 50 is configured as, for example, a lithium-ion secondary battery or a nickel-hydrogen secondary battery, and is connected to the electric power line 54. The battery 50 is managed by an electronic control unit 52 for a battery (hereinafter, referred to as "battery ECU").

Although not shown, the battery ECU 52 is configured as a microprocessor centered on a CPU, and includes a ROM that stores processing programs or a RAM that temporarily stores data, an input and output port, and a communication port in addition to the CPU. Signals from various sensors needed to manage the battery 50 are input to the battery ECU 52 via the input port. Examples of signals input to the battery ECU 52 include a voltage Vb of the battery 50 from a voltage sensor 51a attached between terminals of the battery 50 or a current Ib of the battery 50 from a current sensor 51b attached to an output terminal of the battery 50. The battery ECU 52 is connected to the HVECU 70 via the communication port.

Although not shown, the navigation device 60 includes a main body in which a controller including a storage medium, such as a hard disk, that stores map information and the like, an input and output port, or a communication port is accommodated, a GPS antenna that receives information regarding a current position of the vehicle, and a touch panel type display that displays various information, such as the information regarding the current position of the vehicle or a scheduled travel route to a destination, and allows a user to input various instructions. Here, in the map information, service information (for example, tourist information or parking lot) and road information for each traveling section (for example, between traffic lights or between intersections) are stored as a database. The road information includes distance information, width information, information on the number of lanes, area information (urban areas or suburbs), type information (general roads or highways), gradient information, legal speed, the number of traffic lights, and the like. The information regarding the current position of the vehicle includes current positional information Gp including the latitude and longitude of the current position. The navigation device 60 is connected to the HVECU 70 via the communication port.

Although not shown, the HVECU 70 is configured as a microprocessor centered on a CPU, and includes a ROM that stores processing programs or a number (hereinafter, referred to as "vehicle number") Vid for specifying the vehicle or a RAM that temporarily stores data, an input and output port, and a communication port in addition to the CPU. A signal of a moisture detection signal Swtr from a moisture sensitive sensor 62 that outputs signals in a case where moisture equal to or larger than a predetermined amount (for example, a value determined by experiments or analysis as a lower limit value of an average volume range of raindrops) is detected or the current positional information Gp from the navigation device 60 is input to the HVECU 70 via the input port. The moisture sensitive sensor 62 is disposed, in the engine compartment that accommodates the engine 22, at a position that is not exposed to water while the vehicle is traveling, for example, a space between an intake system of the engine 22 and a cylinder block. As a situation in which the moisture detection signal Swtr is output from the moisture sensitive sensor 62, a situation in which the engine compartment is opened by exposure to dust and the inside is cleaned is conceivable. In a case where the moisture detection signal Swtr is output from the moisture sensitive sensor 62, the HVECU 70 measures elapsed days Dc as the number of days since the moisture detection signal Swtr is output. The HVECU 70 is connected to the engine ECU 24, the motor ECU 40, and the battery ECU 52 via the communication port as described above.

A communication device 76 performs communication between the HVECU 70 and the outside.

The management center 80 includes the computer 82 as a management server, a storage device 84, and a communication device 86. The computer 82 includes a ROM that stores processing programs or a RAM that temporarily stores data, an input and output port, and a communication port in addition to the CPU. The storage device 84 is configured as a hard disk, an SSD, or the like. The storage device 84 stores map information same as the map information stored in the navigation device 60 of the hybrid vehicle 20. The communication device 86 performs communication between the computer 82 and the outside. The computer 82, the storage device 84, and the communication device 86 are mutually connected via a signal line.

The dealer 90 is mainly configured as a store that sells vehicles. The dealer 90 includes a computer 92 and a storage device 94. The computer 92 includes a ROM that stores processing programs or a RAM that temporarily stores data, an input and output port, and a communication port in addition to the CPU. The storage device 94 is configured as a hard disk, an SSD, or the like. The computer 92 and the storage device 94 are mutually connected via the signal line. The computer 92 is connected to the computer 82 of the management center 80 via a network 19, and exchanges various data with the computer 82. Equipment (not shown) for maintaining and inspecting the vehicle is provided in the dealer 90.

Figure 3:
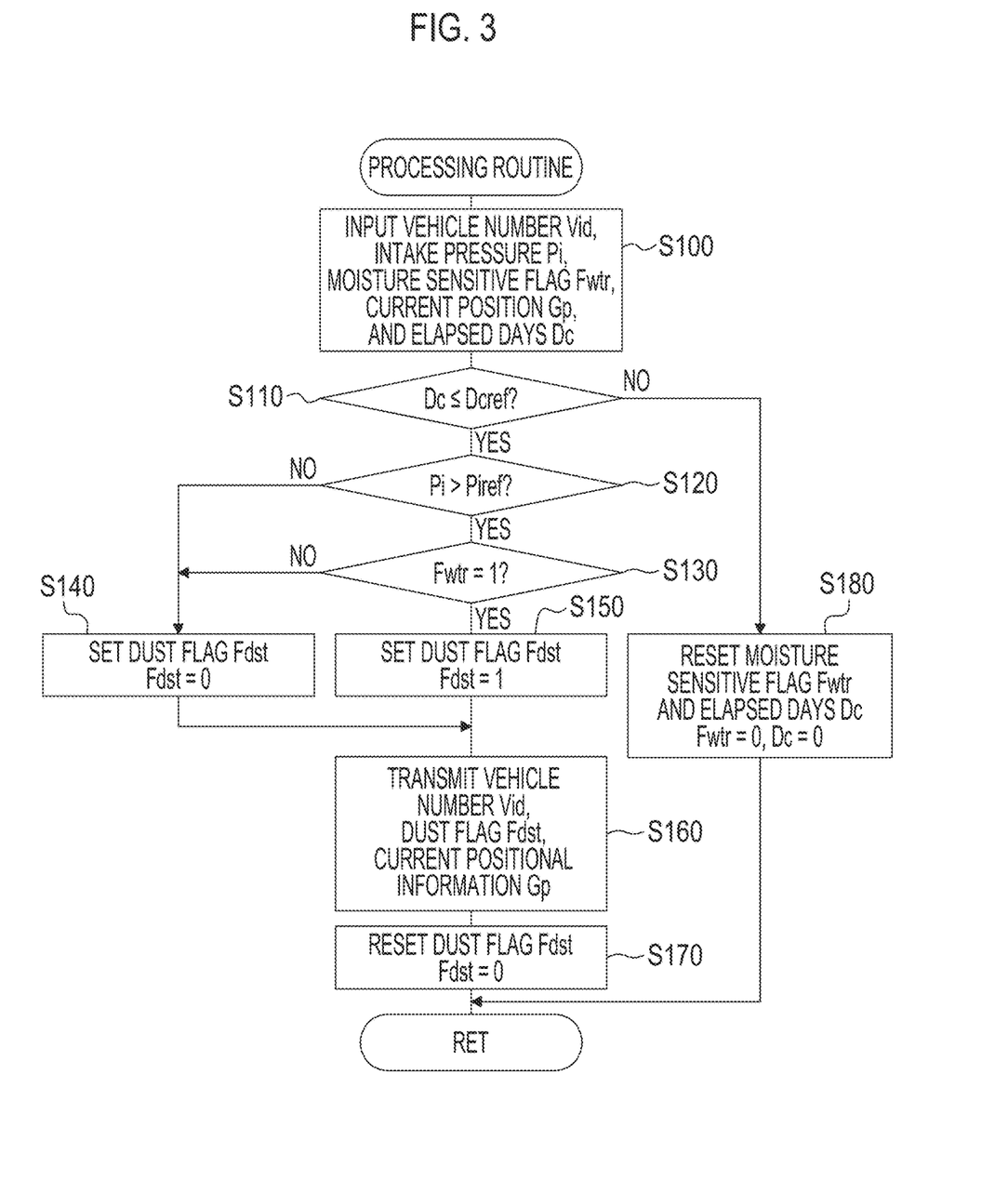
FIG. 3 is a flowchart showing an example of a processing routine executed by a HVECU 70 of the hybrid vehicle 20.
Figure 4:
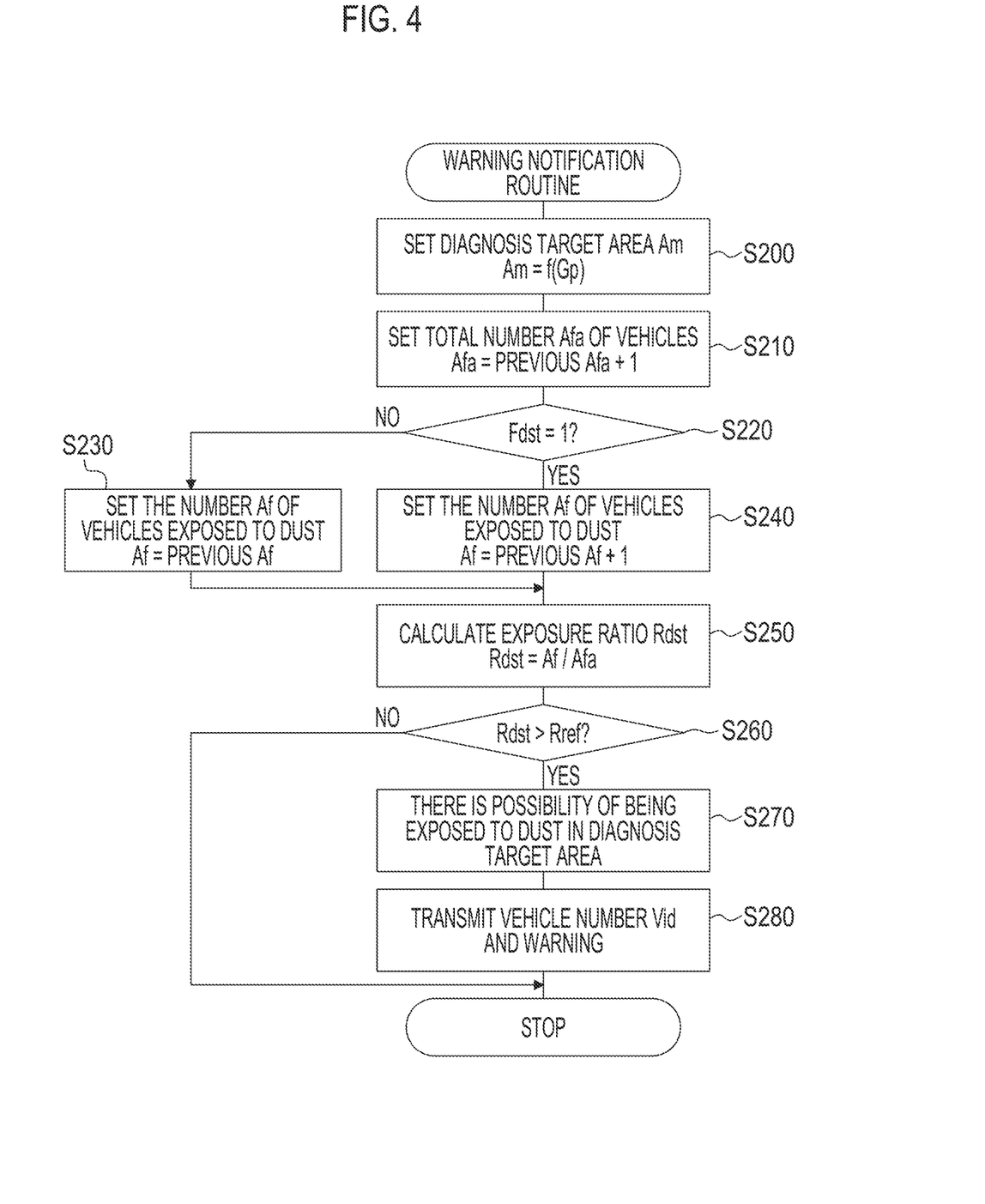
FIG. 4 is a flowchart showing an example of a warning notification routine executed by a computer 82 of a management center 80.

Next, the operation of the vehicle diagnostic system 10 configured as described above will be described. FIG. 3 is a flowchart showing an example of a processing routine executed by the HVECU 70 of the hybrid vehicle 20. FIG. 4 is a flowchart showing an example of a warning notification routine executed by the computer 82 of the management center 80. The processing routine in FIG. 3 is executed at predetermined time intervals (for example, every several milliseconds). The warning notification routine in FIG. 4 is executed in a case where the management center 80 receives the vehicle number Vid, a dust flag Fdst, and the current positional information Gp from the hybrid vehicle 20. Therefore, the processing routine in FIG. 3 will be described first, and then the warning notification routine in FIG. 4 will be described.

In a case where the processing routine in FIG. 3 is executed, the CPU of the HVECU 70 executes processing of inputting the vehicle number Vid, the intake pressure Pi, a moisture sensitive flag Fwtr, the current positional information Gp, or the elapsed days Dc (step S100). The vehicle number Vid that is stored in the ROM is input. The intake pressure Pi that is detected by the intake pressure sensor 23c is input by communication via the engine ECU 24. The moisture sensitive flag Fwtr is a flag set to a value 0 in a case where the moisture detection signal Swtr is not output from the moisture sensitive sensor 62, and set to a value 1 in a case where the moisture detection signal Swtr is output from the moisture sensitive sensor 62. The current positional information Gp that is output from the navigation device 60 is input. The elapsed days Dc that is measured as the number of days since the moisture sensitive sensor 62 outputs the moisture detection signal Swtr, that is, the number of days since the moisture sensitive flag Fwtr becomes the value 1 is input.

In a case where the data is input in this way, determination is subsequently made as to whether or not the elapsed days Dc is equal to or less than a threshold value Dcref (step S110). The threshold value Dcref is a threshold value for determining whether or not a certain number of days have elapsed since the moisture sensitive flag Fwtr becomes the value 1, and is set to, for example, 12 days, 14 days, or 16 days. In a case where the moisture detected by the moisture sensitive sensor 62 is caused by cleaning the inside of the engine compartment, consideration is made that in a case where the elapsed days Dc exceeds the threshold value Dcref, the moisture is evaporated and the moisture sensitive sensor 62 does not detect the moisture. Therefore, in a case where the elapsed days Dc since the moisture sensitive sensor 62 detects moisture exceeds the threshold value Dcref, consideration is made that moisture enters the engine compartment due to a cause other than cleaning of the inside of the engine compartment. In step S130 described below, a value of the moisture sensitive flag Fwtr is checked to determine whether or not the inside of the engine compartment is cleaned. Therefore, in a case where the elapsed days Dc exceeds the threshold value Dcref, appropriately, the determination in step S130 is not performed, and consideration is made that steps S120 to S170 described below are not to be executed. Therefore, the processing of step S110 is processing of determining whether or not steps S120 to S170 described below may be executed.

In a case where the elapsed days Dc is equal to or less than the threshold value Dcref, determination is made that steps S120 to S170 may be executed, and determination is made as to whether or not the intake pressure Pi exceeds a threshold value Piref (step S120). The threshold value Piref is a threshold value for determining whether or not some kind of clogging occurs in the intake system of the engine 22, although the intake system does not fail. The threshold value Piref is set to a value that is increased by about 20% or 30% from the intake pressure of a case where the engine 22 is not clogged (a negative pressure is a value that is reduced by about 20% or 30% from an intake negative pressure of a case where the engine 22 is not clogged). The intake pressure of a case where the engine 22 is not clogged is stored in the ROM as a map by predetermining the relationship between the rotation speed of the engine 22, the load factor, and the intake pressure by experiments or analysis, and can be derived from the rotation speed Ne of the engine 22, the load factor KL, and the map stored in the ROM that are input through the communication from the engine ECU 24. Therefore, step S120 is processing of determining whether or not the intake system of the engine 22 is clogged to the extent that the intake system does not fail.

In a case where the intake pressure Pi is equal to or less than the threshold value Piref in step S120, determination is made that the engine 22 is not clogged and there is no possibility of the hybrid vehicle 20 being exposed to dust, and the dust flag Fdst is set to the value 0 (step S140).

In a case where the intake pressure Pi exceeds the threshold value Piref in step S120, determination is made that the intake system of the engine 22 is clogged to the extent that the intake system does not fail, and subsequently, determination is made as to whether or not the moisture sensitive flag Fwtr is the value 1 (step S130). The moisture sensitive sensor 62 is disposed at a position that is not exposed to water in a case where the engine compartment is not opened. Therefore, in a case where the moisture sensitive flag Fwtr is the value 1, consideration is made that in a case where the engine compartment is opened, the inside is cleaned with water, and the moisture remains in the engine compartment. Therefore, step S130 is a threshold value for determining whether or not the engine compartment is opened and the inside is cleaned with water.

In a case where the moisture sensitive flag Fwtr is the value 0 in step S130, determination is made that the engine compartment is not cleaned with water, and the dust flag Fdst is set to the value 0 (step S140).

In a case where the moisture sensitive flag Fwtr is the value 1 in step S130, diagnosis is made that there is a possibility of the hybrid vehicle 20 being exposed to dust because the inside of the engine compartment is cleaned with water, and the dust flag Fdst is set to the value 1 (step S150). By such processing, the possibility of the hybrid vehicle 20 being exposed to dust can be diagnosed before the engine 22 of the hybrid vehicle 20 fails. The value of the dust flag Fdst indicates a diagnosis result of whether or not there is the possibility of being exposed to dust.

In a case where the dust flag Fdst is set in this way, the vehicle number Vid stored in the ROM, the dust flag Fdst, and the current positional information Gp are transmitted to the management center 80 via the communication device 76 (step S160). Then, the dust flag Fdst is reset to the value 0 (step S170), and the processing routine ends.

In step S110, in a case where the elapsed days Dc exceeds the threshold value Dcref, determination is made that steps S120 to S170 are not to be executed, the moisture sensitive flag Fwtr and the elapsed days Dc are reset to the value 0 (step S180), and the processing routine ends.

Hereinafter, the warning notification routine in FIG. 4 executed by the computer 82 of the management center 80 will be described. The warning notification routine in FIG. 4 is executed in a case where the computer 82 inputs, via the communication device 86, the vehicle number Vid, the dust flag Fdst, and the current positional information Gp that are transmitted from the communication device 76 of the hybrid vehicle 20.

In a case where the warning notification routine in FIG. 4 is executed, the computer 82 of the management center 80 sets an area in which the hybrid vehicle 20 that transmits the vehicle number Vid, the dust flag Fdst, and the current positional information Gp is currently positioned as a diagnosis target area Am based on the current positional information Gp (step S200). The diagnosis target area Am may be, for example, a section including the current positional information Gp in a case where the area is divided into a plurality of sections (for example, a section of a square of 1 km on a side) based on the map information stored in the storage device 84, or may be one area corresponding to the current positional information Gp among the areas that is predetermined in a city unit or a village unit.

Next, the total number Afa of vehicles of the hybrid vehicle 20 that transmits the dust flag Fdst in the diagnosis target area Am is set (step S210). The total number Afa of vehicles is set by adding the value 1 to the total number Afa of vehicles (previous Afa) set before executing the routine. In a case where the warning notification routine is executed for the first time, the value 0 is set in the previous Afa as an initial value.

Subsequently, determination is made as to whether or not the input dust flag Fdst is the value 1 (step S220), and the total number Af of hybrid vehicles 20 (the number of vehicles exposed to dust) that transmits the dust flag Fdst of the value 1 so far in the diagnosis target area Am is set (steps S230, S240). In a case where the dust flag Fdst is the value 0 in step S220, the total number of hybrid vehicles 20 (previous Af) that transmits the dust flag Fdst of the value 1 in the diagnosis target area Am when previous executing the routine is set to the number Af of vehicles exposed to dust (step S230). In a case where the dust flag Fdst is the value 1, the value obtained by adding the value 1 to the previous Af is set to the number Af of vehicles exposed to dust (step S240). In a case where the warning notification routine is executed for the first time, the value 0 is set in the previous Af as an initial value.

In a case where the total number Afa of vehicles and the number Af of vehicles exposed to dust are set in this way, a ratio (exposure ratio) Rdst (=Af/Afa) of the number Af of vehicles exposed to dust to the total number Afa of vehicles is calculated (step S250), and determination is made as to whether or not the exposure ratio Rdst exceeds a predetermined ratio Rref (step S260). The predetermined ratio Rref is a threshold value for determining whether or not there are many hybrid vehicles 20 having the possibility of being exposed to dust in the diagnosis target area Am, and is set to, for example, 0.2, 0.3, or 0.4.

In a case where the exposure ratio Rdst is equal to or less than the predetermined ratio Rref in step S260, determination is made that there are not so many hybrid vehicles 20 having the possibility of being exposed to dust in the diagnosis target area Am, and the warning notification routine ends.

In a case where the exposure ratio Rdst exceeds the predetermined ratio Rref in step S260, determination is made that the number of the hybrid vehicles 20 having the possibility of being exposed to dust in the diagnosis target area Am increases and there is the possibility of being exposed to dust in the entire diagnosis target area Am (step S270), the input vehicle number Vid and warning information that there is the possibility of being exposed to dust in the diagnosis target area Am are transmitted to the dealer 90 (step S280), and the routine ends. By such processing, the dealer 90 can be notified of that there is the possibility of being exposed to dust in the diagnosis target area Am.

The computer 92 of the dealer 90 that receives the vehicle number Vid and the warning information stores the received vehicle number Vid and warning information in the storage device 94. The warning notification routine in FIG. 4 is executed every time the computer 82 of the management center 80 inputs, via the communication device 86, the vehicle number Vid, the dust flag Fdst, and the current positional information Gp that are transmitted from the communication device 76 of each hybrid vehicle 20. Therefore, a dust exposure occurrence area Adst having the possibility of being exposed to dust and the vehicle number Vid of the hybrid vehicle 20 that has been in the dust exposure occurrence area Adst are accumulated in the storage device 94 of the dealer 90.

In a case where the hybrid vehicle 20 enters for periodic inspection or the like and the vehicle number Vid is input, the computer 92 of the dealer 90 collates the input vehicle number Vid with the vehicle number Vid stored in the storage device 94. Then, in a case where the input vehicle number Vid of the hybrid vehicle 20 and the vehicle number Vid stored in the storage device 94 match, determination is made that the entered hybrid vehicle 20 is exposed to dust, and a maintenance request that requests handling appropriately for the hybrid vehicle 20 exposed to dust, for example, maintenance, such as cleaning of the combustion chamber of the engine 22 or cleaning of the exhaust passage 110, or an inspection of the combustion chamber of the engine 22 or the exhaust passage 110 is notified to a display (not shown) that is connected to the computer 92 of the dealer 90. At the dealer 90 that recognizes the maintenance request, the staff can maintain or inspect the combustion chamber or the intake system of the engine 22 to suppress the problem of the hybrid vehicle 20 due to the exposure to dust.

With the vehicle diagnostic system 10 including the vehicle diagnostic device according to the embodiment, in a case where the intake pressure Pi of the engine 22 is larger than the threshold value Piref and the moisture is detected by the moisture sensitive sensor 62, diagnosis can be made that there is the possibility of the hybrid vehicle 20 being exposed to dust to diagnose the possibility of the hybrid vehicle 20 being exposed to dust before the hybrid vehicle 20 fails.

Further, the moisture sensitive sensor 62 may be disposed at a position that is not exposed to water while the hybrid vehicle 20 is traveling. In this way, the cleaning in the engine compartment can be more reliably detected.

Further, the HVECU 70 of the hybrid vehicle 20 transmits the dust flag Fdst indicating whether or not the hybrid vehicle 20 is exposed to dust and the current positional information Gp of the hybrid vehicle 20 to the management center 80, the management center 80 sets the diagnosis target area Am based on the current positional information Gp, and transmits the warning information to the dealer 90 in a case where the exposure ratio Rdst that is a ratio of the number Af of vehicles exposed to dust to the total number Afa of vehicles in the set diagnosis target area Am exceeds the predetermined ratio Rref based on the dust flag Fdst, and thus the possibility of the hybrid vehicle 20 being exposed to dust can be diagnosed before the hybrid vehicle 20 fails.

In the vehicle diagnostic system 10 including the vehicle diagnostic device according to the embodiment, determination is made as to whether or not the exposure ratio Rdst of the number Af of vehicles exposed to dust to the total number Afa of vehicles exceeds the predetermined ratio Rref in step S260 of the warning notification routine in FIG. 4. However, in step S260, instead of whether or not the exposure ratio Rdst exceeds the predetermined ratio Rref or in addition to whether or not the exposure ratio Rdst exceeds the predetermined ratio Rref, determination may be made as to whether or not the number Af of vehicles exposed to dust is a predetermined number Afref (for example, 100, 200, or 300). In this case, in a case where the number Af of vehicles exposed to dust exceeds the predetermined number Afref, the processing proceeds to step S270, and diagnosis need only be made that there is the possibility of the hybrid vehicle 20 being exposed to dust in the diagnosis target area Am.

In the vehicle diagnostic system 10 including the vehicle diagnostic device according to the embodiment, the warning notification routine in FIG. 4 is executed by the computer 82 of the management center 80, but a part or all of the warning notification routine in FIG. 4 may be executed by the computer 92 of the dealer 90, or may be executed by the HVECU 70 of the hybrid vehicle 20.

In the embodiment, the case where the present disclosure is applied to the vehicle diagnostic system 10 including the hybrid vehicle 20 is described as an example. However, the present disclosure may be applied to any embodiment of vehicle as long as the vehicle includes the engine 22. For example, in place of the hybrid vehicle 20, the present disclosure may be applied to a hybrid vehicle including the engine 22 and a motor having a rotating shaft connected to the crankshaft 26 of the engine 22 via the clutch and also connected to the drive shaft 36 without the motors MG1, MG2 or the planetary gear 30, or a vehicle including the engine 22 and a transmission connected to the crankshaft 26 of the engine 22 and the drive shaft 36 without the motors MG1, MG2 or the planetary gear 30.

In the embodiment, the case where the present disclosure is applied to the vehicle diagnostic system 10 including the hybrid vehicles 20, the management center 80, and the dealer 90 is described as an example. However, the present disclosure may be applied to a vehicle diagnostic system including the hybrid vehicles 20 and the dealer 90 without the management center 80, or a vehicle diagnostic system including the hybrid vehicles 20 and the management center 80 without the dealer 90. Also, the vehicle diagnostic system may include a plurality of dealers 90.

The correspondence between the main elements of the embodiment and the main elements of the disclosure described in the Summary section will be described. In the embodiment, the hybrid vehicle 20 corresponds to the "vehicle", the engine 22 corresponds to the "internal combustion engine", the moisture sensitive sensor 62 corresponds to the "moisture sensitive sensor", and the HVECU 70 of the hybrid vehicle 20 corresponds to the "vehicle diagnostic device".

The correspondence between the main elements of the embodiment and the main elements of the disclosure described in the Summary section is an example to specifically describe the embodiment for carrying out the disclosure described in the Summary section, and is not construed to limit elements of the disclosure described in the Summary section. That is, the interpretation of the disclosure described in the Summary section should be made based on the description of the section, and the embodiment is solely the specific example of the disclosure described in the Summary section.

As described above, the aspect of implementing the present disclosure has been described using the embodiment. However, the applicable embodiment is not limited to the embodiment, and various modifications could be made without departing from the scope of the present disclosure.

The present disclosure can be used in the manufacturing industry of a vehicle diagnostic device and a vehicle diagnostic system.

What is claimed is:

1. A vehicle diagnostic system that diagnoses a plurality of vehicles on which an engine and a moisture sensitive sensor that is disposed in an engine compartment and configured to detect moisture are mounted, the vehicle diagnostic system comprising:
 a vehicle diagnostic device configured to diagnose that there is a possibility of a vehicle, among the plurality of vehicles, being exposed to dust in a case where an intake pressure of the engine of the vehicle is higher than a predetermined value and the moisture is detected by the moisture sensitive sensor; and
 an information transmission device configured to transmit information to at least one dealer of the vehicle, wherein:
 each of the plurality of vehicles includes a positional information acquisition device configured to acquire positional information regarding a current position of the each vehicle;
 the vehicle diagnostic device is configured to transmit a diagnosis result of whether or not there is a possibility of the vehicle being exposed to dust and the positional information of the diagnosed vehicle to the information transmission device; and
 the information transmission device is configured to set an area in which the diagnosed vehicle is currently positioned based on the positional information, and to transmit information that there is the possibility of being exposed to dust in the set area to the dealer in a case where, in the set area, at least one of a condition that a ratio of the number of the vehicles diagnosed as having the possibility of being exposed to dust to a total number of the vehicles exceeds a predetermined ratio and a condition that the number of the vehicles diagnosed as having the possibility of being exposed to dust exceeds a predetermined number is established, based on the diagnosis result.

2. The vehicle diagnostic system according to claim 1, wherein the moisture sensitive sensor is disposed at a position that is not exposed to water while the vehicle is traveling.

* * * * *